United States Patent [19]
Greger

[11] 3,751,144
[45] Aug. 7, 1973

[54] COPYING CINEMATOGRAPHIC FILM

[75] Inventor: Georg Greger, Munich, Germany

[73] Assignee: Constantin Film GmbH, Munich, Germany

[22] Filed: June 3, 1971

[21] Appl. No.: 149,603

[30] Foreign Application Priority Data
June 9, 1970 Germany.................. P 20 28 373.2

[52] U.S. Cl..................... 352/38, 352/232, 352/239
[51] Int. Cl. ........................................... G03b 21/32
[58] Field of Search...................... 352/38, 232, 239

[56] References Cited
UNITED STATES PATENTS
3,396,021  8/1968  Monteleoni et al............... 352/38 X
1,032,172  7/1912  Zollinger............................ 352/232

Primary Examiner—Samuel S. Matthews
Assistant Examiner—Russell E. Adams, Jr.
Attorney—Ostrolenk, Faber, Gerb & Soffen

[57] ABSTRACT

A skip-frame film is produced starting with a broad screen negative film exposed in a conventional manner. The negative film is suitable for the production of wide screen copies in a conventional manner. The images occurring one after the other on the negative film are reduced optically without distortion so as to have a height equal to half the conventional four perforation transport step and an image breadth which allows the accommodation of two sound tracks, one along each edge of the film. The images are arranged in two alternating series. The first series are copied in a first copying operation. The following series is copied in a second copying operation with the film images moving in the opposite direction. Intermediate spaces between the individual images are omitted or filled in.

3 Claims, 3 Drawing Figures

COPYING CINEMATOGRAPHIC FILM

The present invention relates to methods of copying cinematographic film and more particularly to methods of copying for the production of skip-frame film. In skip-frame film in accordance with the invention, wide screen images that are normally adapted to be projected by means of four perforation transport steps are instead arranged on a film strip in two alternating series of images running in opposite directions. The individual images, which are recorded without distortion, of the two series have a height of two perforations, equal to half the height of a standard image. Sound tracks are aranged at the edges of the film. Each track corresponds to a respective image series. Each sound track extends over the length of the normal four perforation transport step.

Such a skip-frame film provides for a saving of 50 percent in copying material because each wide screen image only takes up the height of two perforations. In addition, it is not necessary to modify the film transport mechanism in the projector because film speed remains the same. It is necessary to change over the image mask and it may be necessary to modify the focal length of the objective used for projection.

Despite utilisation of an image field which is substantially improved vis-a-vis conventional wide screen cinematographic processes, the skip-frame method has not become accepted in practice. This is occasioned by the picture taking processes usually used in the production of a skip-frame negative wherein an image mask which corresponds to the skip-frame format is placed in the picture taking camera. During picture taking skip-frame images are produced on the negative film with spacing between them. The film is then copied by a contact process so as to produce the image series running in opposite directions. This method has a substantial disadvantage: It is not possible to produce any normal wide screen copies with it.

In developing the present invention it has been found that economic use of film is only to be expected when either a normal copy or a skip-frame copy can be produced as desired from a negative film. Despite the small extent of the changes required for projectors to make use of the skip-frame method, it cannot be expected that the necessary modifications will be made in every cinema. Therefore it is necessary to be able to produce both normal copies and skip-frame copies from a film.

One object of the invention is to provide a method of producing standard broad screen copies or skip-frame copies in a simple manner selectively from one negative film.

For the selective copying for use with either method of projection, a normally exposed negative film is used as a starting material. From this negative, standard copies can be produced. Copies can also be used for television purposes in a conventional manner.

The present invention consists in a method of copying cinematographic film and more particularly to a method of copying for the production of skip-frame film. Wide screen images adapted to be projected by means of normal four perforation transport step are so arranged on a film strip in two series of alternating images running in opposite directions. The individual images are recorded without distortion. The images have a height equal to half the height of a standard image. Sound tracks are arranged at the edges of the film. Each corresponds to a respective image series. Each sound track extends over the length of the normal four perforation transport step. In accordance with the method, starting with a broad screen negative film exposed in a conventional manner, and suitable for the production of wide screen copies in a conventional manner, the images occurring one after the other on the negative film are reduced optically without distortion so as to have a height equal to half the four perforation transport step. The resulting image breadth allows the accommodation of the second sound track. A first copying operation first copies images in the first image series. The following images are copied in a second copying operation moving in the opposite direction. Intermediate spaces between individual images are filled in.

In this manner all film negatives already available can be employed for the skip-frame method. No modification of the camera and/or picture taking methods is necessary. The increase in use of film material as compared with skip-frame picture taking on one negative does not give rise to difficulty because the saving in film material is significant in copying but not in picture taking.

There has been a previous proposal to take abnormally broad scene sections on wide film and compress the images leading to a distortion in their breadth. Then copy the images so produced while simultaneously reducing their size. The images are arranged on the film strip in such a manner that the height of the images on the strip have half the height of standard images. In this method during both picture taking and also copying, it is necessary to use anamorphothic systems and it is also necessary to reduce the picture transport distance or step of the projector by one half. In accordance with a further prior proposal small sized individual images in a series were so arranged that the centers of the images are spaced adjacent same distance apart as is the case with a film with large images. The free space is filled by images of another series of images arranged in the same manner. This previously proposed multi-row cinematographic film is obtained using a negative original and a mirror reversed negative with conventional contact copying methods.

With reference to the accompanying drawing an embodiment of the method in accordance with the invention will be described, in which on the basis of standard dimensions, convenient image dimensions are derived. The dimensions and proportions given are not to be understood as limiting the invention but only as describing a preferred form of it.

In all figures a 35 mm standard film stock 1 is used. It has the conventional four perforation per image system 2.

Figure 1:
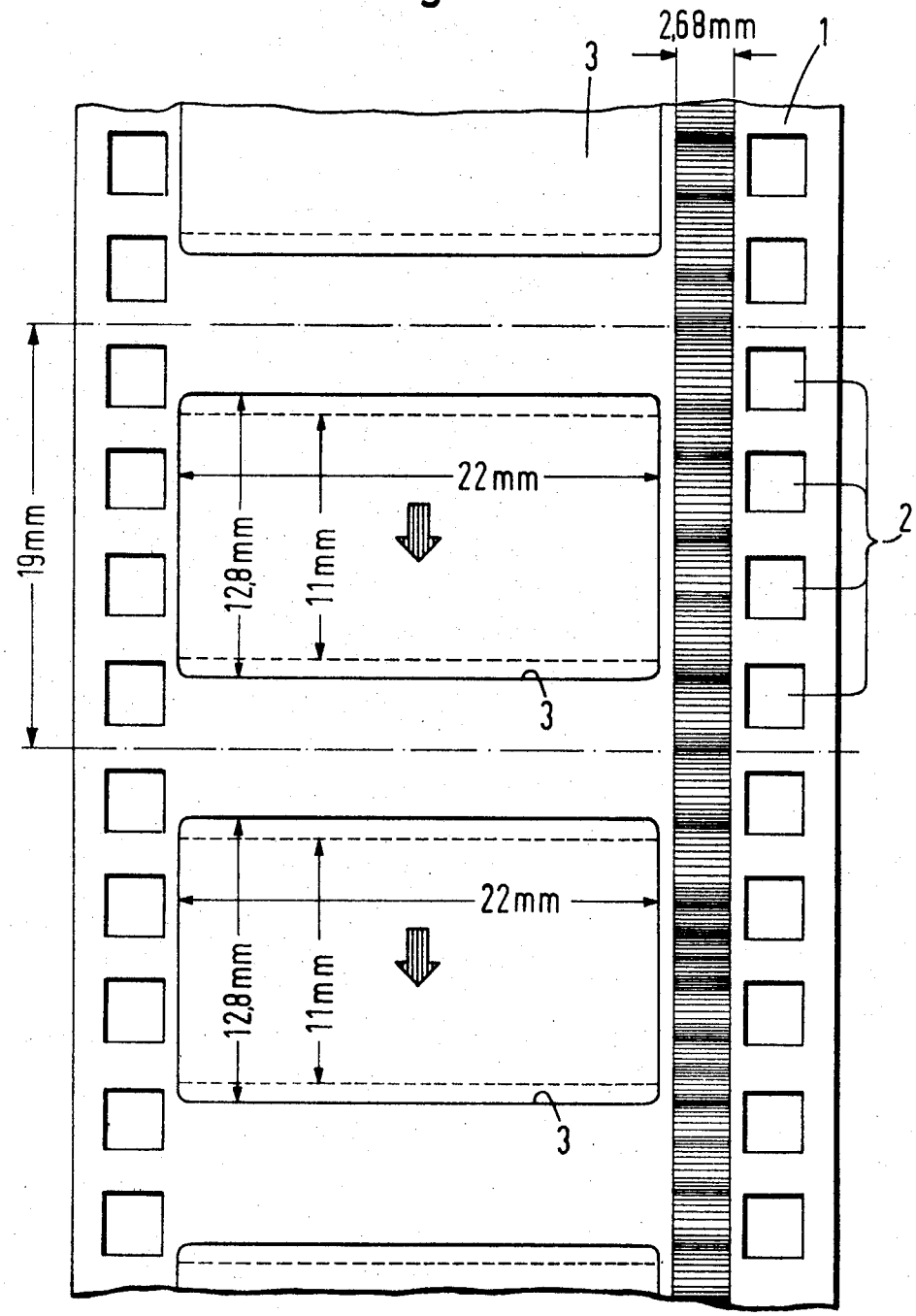
FIG. 1 shows a negative film exposed in a conventional wide screen method.

Each negative image 3 of the film in accordance with FIG. 1 has a normal breadth dimension of 22 mm and a height of 12.8 mm.

Figure 2:
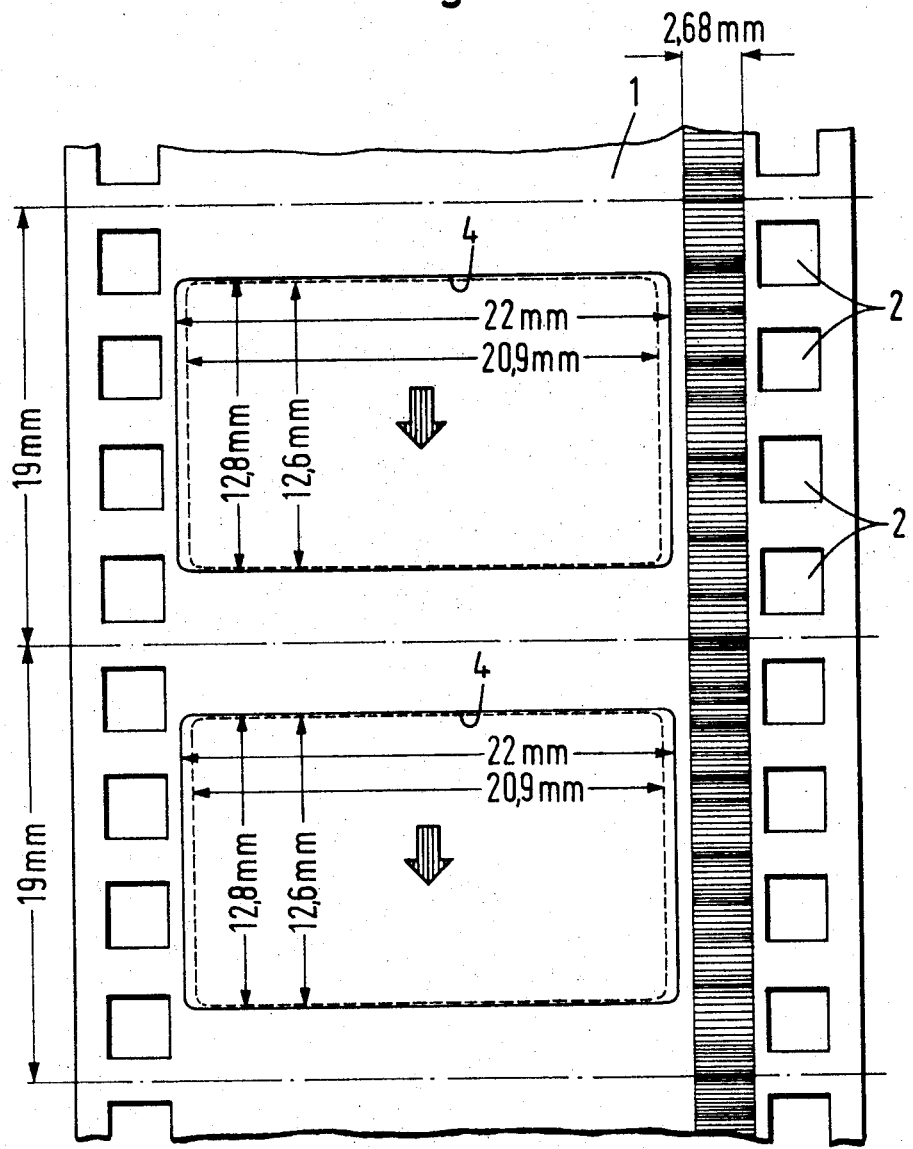
FIG. 2 shows part of a wide screen copy produced in a normal manner from the film in accordance with FIG. 1.

The images 4 of the standard width screen copy of FIG. 2 produced from the film in cccordance with FIG. 1 has the same breadth of 22 mm and the same height of 12.8 mm. In the projector a film image of 20.9 mm × 12.6 mm is projected, giving an aspect ratio of 1:1.66. At the one edge there is the sound track with the conventional breadth of 2.68 mm.

Figure 3:
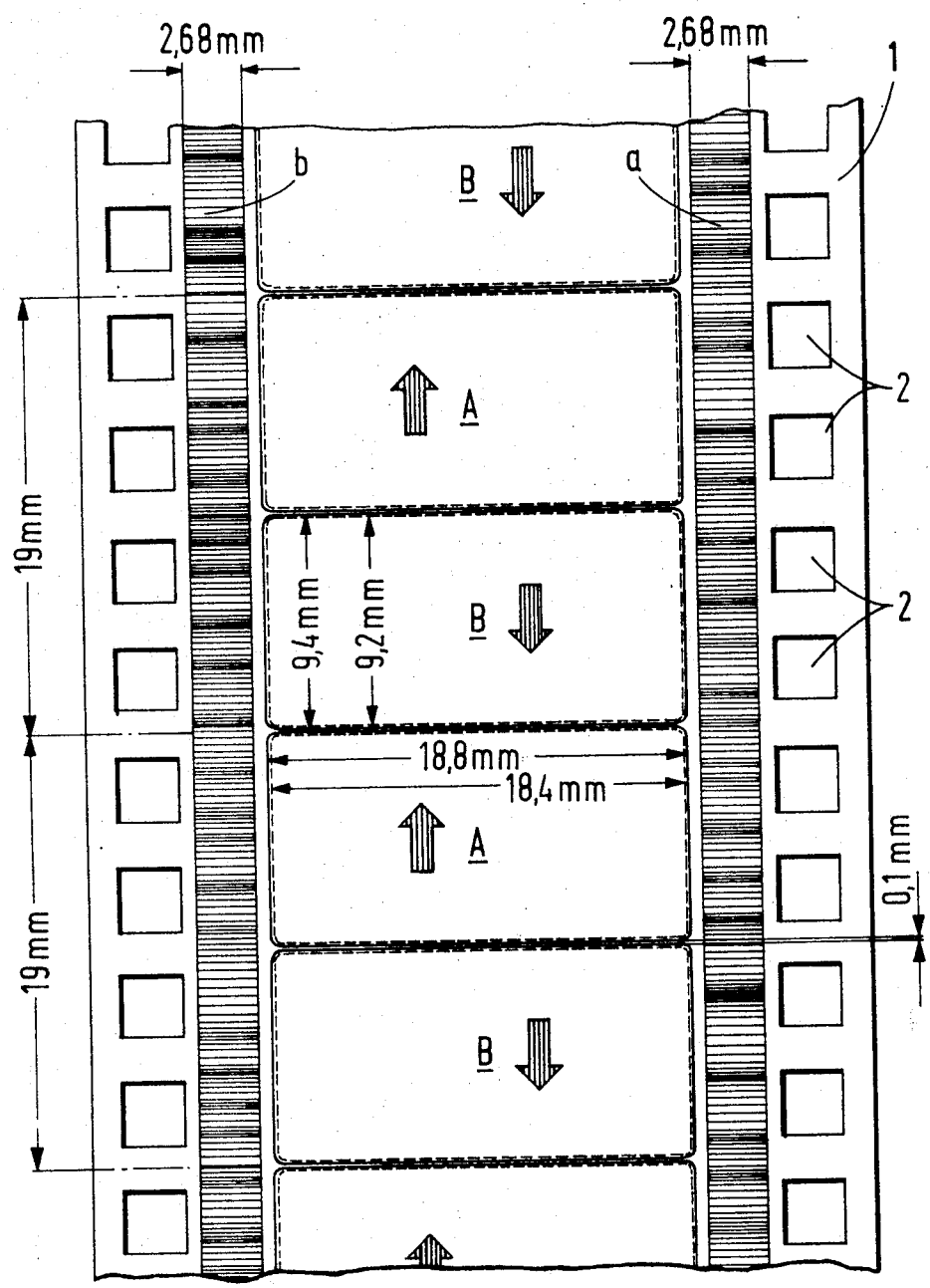
FIG. 3 shows a skip-frame copy produced from the film in accordance with FIG. 1.

In the production of the skip-frame copy in accordance with FIG. 3 a part of each negative image, having dimensions of 11 mm × 22 mm is copied, as is shown in broken lines in FIG. 1.

In the case of the skip-frame copy in accordance with FIG. 3 the images in series A are arranged so that their bottoms face in one direction and images in series B are arranged so that their bottoms respectively are near a bottom of an image in series A. This provides with two series of images running in opposite directions. The first series is projected on running through the projector in one direction for the first time, while the second image series is projected on the return run of the film, so that it is not necessary to rewind.

On one edge of the film there is a sound track $a$, which corresponds to the image series A,A . . . , while on the other edge there is the sound track $b$, which corresponds to the image series B,B . . .

In the projector a mask is used which extends over approximately half the height of the picture gate so as to cover the picture series which is to be projected on the return run. The sound tracks $a$ and $b$ extend over the full transport step of four perforations, i.e. over the height of two respective images. In both directions of travel of the film the sound is in no way impaired, because the speed of travel of the film and the sound pickup occurs in a conventional manner. The breadth of the images A and B amounts to 18.8 mm and the height to 9.4 mm. This gives an aspect ratio of 1:2, which accordingly is more favourable than the conventional aspect ratio of 1:1.66.

The projection window of the projector has a size of 9.2 mm × 18.4 mm to allow a safety factor.

The format of the image A or B is smaller than the format of the image 3 in FIG. 1. The linear reduction in size amounts to about 0.86 (11.7 21 percent). Since the aspect ratio of the images A and B is 1:2, while in the case of image 3 When accordance with FIG. 1 it is only 1:1.66, in reduction in size occurs, small parts of each images must be covered at its upper and lower edges, since from the full image format of 12.8 mm × 22 mm a part of 11 mm × 22 mm is then optically reduced linearly in size to 9.4 mm × 18.8 mm. Therefore, for projection an image field of 9.2 mm × 18.4 mm is available. This does not, however, constitute a disadvantage, because the display practice used at the present time uses projectors with an image mask or opening which only has a height of 11.3 mm in order to obtain a wide screen image of 1:1.85. In current display practice the upper and lower edges of images are cut off. This is taken into account in picture taking, that is to say in these cut off sections it is a matter of routine not to portray any significant scene parts.

The embodiments of the invention in which an exclusive property or privilege is claimed are as follows:

1. A method of producing skip-frame film on which there are two alternating series of images, with each series being arranged in a sequence running in a direction opposite the sequence of the other series, and with each series of images having a sound track, comprising the steps of:

exposing a strip of negative film with a series of images of a first size; optically reducing each image of the negative film, without distortion of the image, in order that the reduced image occupies a height one-half the height occupied by the unreduced image and to have a breadth which permits reception of sound tracks along the edges of the film on which the images are copied;

copying a first series of the optically reduced images from the negative film onto a receiving film, with the copied images of the first series being of a height such that each occupies half the height of an unreduced image and with the copied images spaced apart the height of a reduced image;

copying a second series of the optically reduced images in a sequence moving in the opposite direction from the sequence of the first series onto the spaces between neighboring images of the first series, such that two images, one from each series, have a total height of one unreduced image, and such that intermediate spaces between individual images are omitted.

2. The method of producing skip-frame film of claim 1, comprising the further step of copying two sound tracks, one for each series of images, onto the edges of the receiving film, wherein each sound track is copied at the conventional film movement rate for an unreduced image, whereby the sound track for a respective optically reduced image extends along a film edge a distance for an unreduced image.

3. The method of producing skip-frame film of claim 2, wherein the reduced height of the image is obtained by reducing the entire size of the image without distorting it and cropping the image to reduce its height dimension to the recited level.

* * * * *